June 16, 1953  E. M. CROSLAND ET AL  2,642,014
SHEETING MACHINE FOR DOUGH

Filed Feb. 13, 1948  2 Sheets-Sheet 1

Edward Milner Crosland,
Joseph Francis Naylor, INVENTORS

BY
S. Victor Armstrong
ATTY.

June 16, 1953 E. M. CROSLAND ET AL 2,642,014
SHEETING MACHINE FOR DOUGH
Filed Feb. 13, 1948 2 Sheets-Sheet 2

Edward Milner Crosland,
Joseph Francis Naylor, INVENTORS

BY
S. Victor Armstrong
Atty.

Patented June 16, 1953

2,642,014

UNITED STATES PATENT OFFICE 2,642,014

SHEETING MACHINE FOR DOUGH

Edward Milner Crosland, Culcheth, near Warrington, and Joseph Francis Naylor, Newton-le-Willows, England, assignors to T. & T. Vicars Limited, Earlestown, Newton-le-Willows, England, a British company Application February 13, 1948, Serial No. 8,223
In Great Britain November 28, 1938

Section 1, Public Law 690, August 8, 1946
Patent expires November 28, 1958

5 Claims. (Cl. 107—12)

The present invention relates to an improved apparatus for the manufacture of sheets of dough or other plastic material.

An object of this invention is to provide a number of separate sheets of dough with as much saving in space as possible. Arrangements are known where a number of separate sheeting machines or separate dough moulding machines are arranged in sequence to feed, for instance a number of sheets of dough to a common conveyor in overlapped relationship but considerable space is taken up by such an arrangement which moreover has the disadvantage that each sheeting mechanism may have to be adjusted independently of the others.

It is also known to extrude lumps of dough or the like plastic material from a compression chamber and divide the extruded stream into a number of webs or sheets of dough to be drawn off simultaneously in the same direction.

According to the present invention dough or other plastic material is fed from a hopper into a compression chamber by means of a pair of rolls rotating in opposite directions and disposed in spaced relationship with a second pair of rolls rotating in contact but in spaced relationship with the first pair, dough emerging between the first and second rollers of each pair respectively as a sheet or web, being stripped from the surface of the rolls between which the sheets emerge by stripping knives or blades.

The invention is more particularly described with reference to the accompanying drawings, in which.

Figure 1:
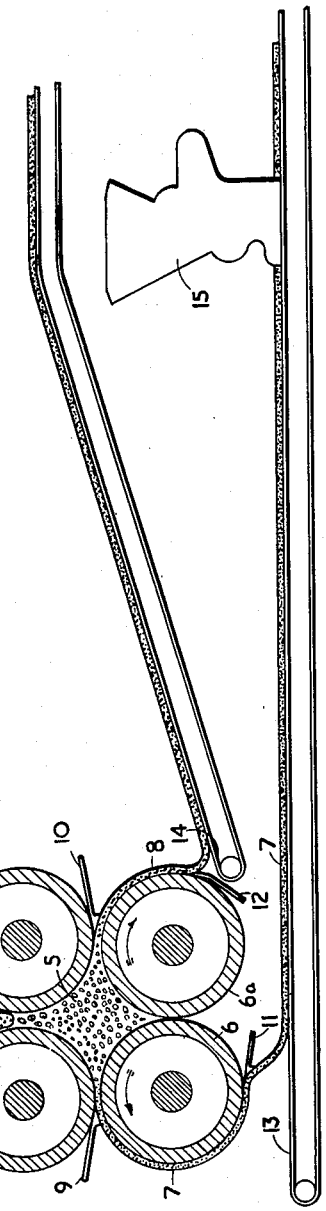
Figure 1 is a diagrammatic side elevation of one form of machine.

As shown in Figure 1 lumps of dough 1 are fed into a hopper 2 and are taken up by knurled or the like feed rolls 3, 4 to be compressed into a compression chamber 5 which is closed by means of a pair of rolls 6, 6a rotating in contact and in opposite directions and adjustably spaced from the rolls 3, 4 so that dough may emerge as sheets 7, 8 from either side of the compression chamber 5 being stripped from the compression rolls 3, 4 by means of the usual stripper blades or knives 9, 10 respectively.

Stripper blades 11, 12 are provided to strip the dough sheets 7, 8 from the rolls 6, 6a and allow these to fall upon conveyors 13, 14 respectively so that one sheet of dough such as 8 may be carried over the other to allow grease, flour or other material to be fed upon the upper surface of the sheet 7 from for instance a sprinkler or other machine 15 prior to the dough sheet 8 being lapped over and if desired subsequently amalgamated with the sheet 7 which latter operation may be effected by passing the two sheets or webs through a gauging machine or by lapping them over in folds or otherwise.

Figure 2:
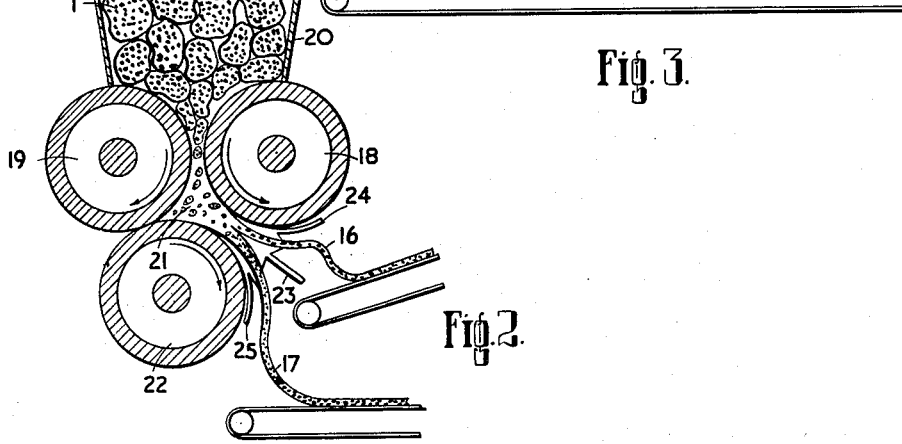
Figure 2 is a diagrammatic view of an alternative arrangement.
Figure 4:
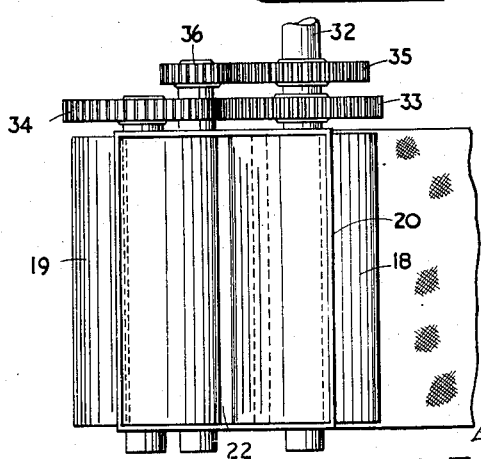
Figure 4 is a diagrammatic plan view of a driving arrangement for the rollers of Figure 2.

As shown in Figure 2 a pair of separate webs or sheets of dough such as 16, 17 will be obtained from a sheeter of the three roll type in which rolls 18, 19 take the dough from a hopper 20 and feed this to a compression space 21 the roller 19 co-operating with the roller 22 whilst a blade or knife 23 severs the dough stream emerging between rolls 18, 22 into a pair of sheets or webs 16, 17, moving in different directions, which are stripped from the rolls 18, 22 respectively by knives or blades 24, 25.

Figure 3:
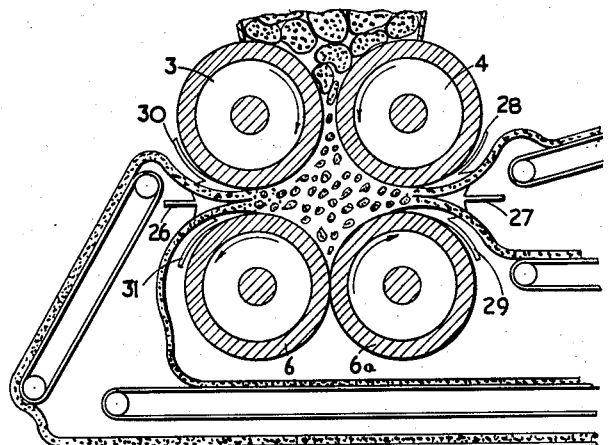
Figure 3 is a diagrammatic view of a further alternative arrangement.

One method of driving the rollers of Figure 2 is shown in Figure 3 in which a shaft 32 driven from a prime mover drives the roller 19 directly and has a pinion 33 driving the shaft of roller 19 in an opposite direction by gearing with the pinion 34 on shaft of the roller 19. The shaft 32 has a second pinion 35 on it meshing with pinion 36 on shaft of roller 22 to drive this in the opposite direction to roller 18.

It will be obvious that where more than two sheets of dough are required a machine such as that shown in Figure 1 may be modified as shown in Figure 3 by providing a dough dividing blade operating between the pairs of rolls such as blades 26, 27 dividing the sheets of dough which are individually stripped by pairs of knife blades 28, 29, 30, 31 respectively from the four rolls of the sheeter 3, 4, 6, 6a. In this case separated conveyors may be provided for taking off the separate sheets of dough.

The stripping blades such as 28, 29 (Fig. 3) or 24, 25 (Fig. 2) are those known in the art where the part contacting the rollers 4 and 6a, as the case may be (Fig. 3), or 18 and 22 (Fig. 2) respectively, is of lunar cross-section. The dividing blade 27, which is similar to the blade 23 of Fig. 2, is roughly of triangular cross-section, its sides, however, being segments of cylinders, this blade, for instance, being supported upon a rigid bracket or other part of the main frame of the machine.

We declare that what we claim is:

1. A dough web forming machine comprising in combination, a plurality of rollers on parallel axes grouped to present a cylindrically sided compression space therebetween, a plurality of said rollers being spaced from each other to provide a plurality of dough outlet passages from said compression space, means to feed dough to a gap between a pair of said rollers, means to constrain dough to emerge from said compression space simultaneously in two separate webs, and scraper blades simultaneously engaging the surfaces of at least two of the said rollers on the sides of at least two of said dough outlet passages from said compression space.

2. A dough web forming machine comprising in combination a plurality of rollers grouped to present a cylindrically sided compression space therebetween, means to feed dough to a gap between a pair of said rollers, means to constrain dough to emerge from said compression space simultaneously in two separate webs, and a plurality of knife edge blades dividing the dough stream extruded from said compression space into a plurality of continuous webs moving in different directions.

3. A dough web forming machine comprising in combination a pair of rollers, means to feed dough to a gap between said pair of rollers, means to drive said pair of rollers in opposite directions, a third roller grouped to form a cylindrically sided compression space with said pair of rollers and spaced from one of them to leave an extrusion opening, means to drive said third roller in the opposite direction to the roller on the opposite side of said extrusion opening, scraper blades co-operating with the periphery of the rollers on the sides of said opening, and a dividing blade in said opening spaced from said scraper blades.

4. A dough web forming machine comprising in combination a plurality of rollers on parallel axes grouped to enclose a cylindrically sided compression space, a pair of which are spaced to provide a feed opening, whilst a pair are spaced to provide an extrusion opening from said compression space, means to revolve the pair spaced to provide a feed opening in opposite directions, means to drive the pair spaced to provide an extrusion opening in the same direction, scraper blades on the periphery of the pair rotating in the same direction and means to divide the extruded stream into two continuous webs moving in differing directions.

5. A dough web forming machine comprising in combination a plurality of rollers on parallel axes grouped to present a cylindrically sided compression space, means to drive a pair of said rollers, which are disposed in spaced relationship, in opposite directions of rotation, means to feed dough between said pair of rollers, means to drive another pair of rollers, which are disposed in spaced relationship, in the same directions, means to lead off from said compression space a plurality of dough webs in different directions, said means including scrapers engaging the periphery of one roller of each of said pairs adjacent the outlets provided by said spaces therebetween through which said dough webs emerge, and a plurality of separate conveyors for said dough webs.

EDWARD MILNER CROSLAND.
JOSEPH FRANCIS NAYLOR.

References Cited in the file of this patent

UNITED STATES PATENTS

| Number | Name | Date |
|---|---|---|
| 959,537 | Hoyer | May 31, 1910 |
| 1,550,427 | Corl | Aug. 18, 1925 |
| 1,731,260 | Nobbe | Oct. 15, 1929 |
| 1,872,691 | Drake | Aug. 23, 1932 |
| 1,908,825 | Drake | May 16, 1933 |
| 2,034,346 | Lauterbur | Mar. 17, 1936 |
| 2,078,777 | Schade | Apr. 27, 1937 |

FOREIGN PATENTS

| Number | Country | Date |
|---|---|---|
| 321,403 | Great Britain | Nov. 4, 1929 |